United States Patent [19]

Shimada et al.

[11] Patent Number: 5,210,868
[45] Date of Patent: May 11, 1993

[54] DATABASE SYSTEM AND MATCHING METHOD BETWEEN DATABASES

[75] Inventors: Shigeru Shimada, Kodaira; Kazuyuki Suzuki, Toride; Naoki Yamamoto, Funabashi; Nobuyuki Chikada, Tama; Sirou Takei, Konosu, all of Japan

[73] Assignees: Hitachi Ltd.; The Tokyo Electric Power Co., Inc., both of Tokyo, Japan

[21] Appl. No.: 630,328

[22] Filed: Dec. 19, 1990

[30] Foreign Application Priority Data

Dec. 20, 1989 [JP] Japan ................... 1-328515
Feb. 9, 1990 [JP] Japan ................... 2-028561

[51] Int. Cl.$^5$ ............................................ G06F 15/40
[52] U.S. Cl. ............................... 395/600; 364/DIG. 1; 364/283.4; 364/259.2
[58] Field of Search ............... 364/DIG. 1, DIG. 2; 395/600

[56] References Cited

U.S. PATENT DOCUMENTS

| | | | |
|---|---|---|---|
| 4,769,772 | 9/1988 | Dwyer | 364/DIG. 1 |
| 4,815,005 | 3/1989 | Oyanagi et al. | 364/DIG. 1 |
| 4,864,497 | 9/1989 | Lowry et al. | 364/DIG. 1 |
| 4,893,232 | 1/1990 | Shimaoka et al. | 364/DIG. 1 |
| 5,047,918 | 9/1991 | Schwartz et al. | 395/600 |

OTHER PUBLICATIONS

Alfred V. Aho, et al., "Efficient String Matching: An Aid to Bibliographic Search", Communications of the ACM, vol. 18, No. 6, Jun. 1975, pp. 333-340.
Hiroshi Tsuji, et al., "Expert System for Transferring Programming Knowhow from Skilled to Unskilled Programmers", vol. 3, No. 6, Nov. 1988, pp. 755-764.
Donald E. Knuth, et al., "Fast Pattern Matching in Strings" Siam J. Comput., vol. 6, No. 2, Jun. 1977, pp. 323-350.
Shigeru Shimada, et al., "Object-Oriented Multimedia Annotation for Large-Scale Mapping System", Hitachi, Ltd. and Tokyo Electric Power Co., Ltd., pp. 1-14.

Primary Examiner—Thomas M. Heckler
Attorney, Agent, or Firm—Fay, Sharpe, Beall, Fagan, Minnich & McKee

[57] ABSTRACT

In a database system for map information, matching and retrieving operations are carried out between an attribute database associated with a business and a map database. A matching key word is separated into a common noun part and a proper noun part, a synonym and an abbreviated word are inferred by employing rules respectively. Furthermore, a candidate key word is inferred by employment of a rule for combining these results at an optimum state, whereby a matching process is performed. Another address database is employed so as to realize a mutual retrieving operation even when the attribute database is not matched with the map database.

17 Claims, 12 Drawing Sheets

| NO. | INPUTTED KEY WORD | ASSOCIATIVE KEY WORD | FUZZINESS | ASSOCIATIVE KEY WORD | FUZZINESS |
|---|---|---|---|---|---|
| 1 | COMPANY | STOCK COMPANY | 0.8 | CO., LTD. | 0.8 |
| | | CO., INC. | 0.6 | LTD. | 0.6 |
| | | INCORPORATION | 0.5 | FIRM | 0.3 |
| 2 | HEAD OFFICE | HEAD SHOP | 0.3 | MAIN OFFICE | 0.5 |
| 3 | MAIN OFFICE | CENTER | 0.5 | | |

FIG. 5

| NO. | ABBREVIATED KEY WORD | ASSOCIATIVE KEY WORD | FUZZINESS | ASSOCIATIVE KEY WORD | FUZZINESS |
|---|---|---|---|---|---|
| 1 | HEIDEN | HEISEI ELECTRIC | 0.8 | HEISEI PLANNING | 0.4 |
|   |        | HEISEI EQUIPMENT | 0.4 | HEISEI TELECOM | 0.3 |
|   |        | HEISEI ELECTRONICS | 0.2 | HEISEI ELECTRIC MACHINE | 0.2 |
| 2 | HITACHI | HITACHI | 0.8 | HITACHI CABLE | 0.4 |
|   |         | HITACHI MAXELL | 0.4 | HITACHI HOME ELECTRONICS | 0.4 |
|   |         | HITACHI SHIPBUILDER | 0.2 |  |  |

FIG. 6

| NO. | IF - PART | THEN - PART |
|---|---|---|
| 1 | $pa \geq thu$ AND $pb \geq th\ell$ | ADD $aNbN$ |
| 2 | $thu \geq pa \geq th\ell$ | ADD $bNaN$ |
|   |  |  |

FIG. 7

| CD01 | NM01 | CD02 | NM02 |
|---|---|---|---|
| ADRESS CODE PART | HOUSE NAME CODE PART | HOUSE CODE PART | PRIVATE NAME CODE PART |

① CUSTOMER ATTRIBUTE DATA RETRIEVAL

| CUSTOMER NUMBER | NAME | ADDRESS CODE | BLOCK CODE | ADDRESS | CUSTOMER INFORMATION | MAP NUMBER |
|---|---|---|---|---|---|---|
| 0000011001 | TARO UENO | 31020601 | 02 | 01 | X X X X X | MATCHED : YES UNMATCHED : NuLL |

② RETRIEVAL OF ADDRESS DATA FROM CUSTOMER ATTRIBUTE DATA

| ADDRESS CODE / BLOCK CODE | ADDRESS | MAP NUMBER | | CUSTOMER SERIAL NO. | |
|---|---|---|---|---|---|
| 3102060102 | X X X X | 6101 | NULL | 0000011 | NULL |

③ RETRIEVAL OF ADDRESS DATA WITHIN BLOCK

① MAP DATA RETRIEVAL

| MAP NUMBER | NAME | ADDRESS CODE | BLOCK CODE | ADDRESS NO. | MAP INFORMATION | CUSTOMER NUMBER |
|---|---|---|---|---|---|---|
| 6103 | KUNIO YAMADA | 3102 0601 | 02 | 03 | XXXXX | MATCHED:YES UNMATCHED: Null |

② ADDRESS DATA RETRIEVAL

| ADDRESS CODE / BLOCK CODE | ADDRESS | MAP NUMBER | | CUSTOMER SERIAL NUMBER | |
|---|---|---|---|---|---|
| 31020601 | XXXXXX | 6103 | NULL | 0000011 | NULL |

F I G. 13B

① NAME / ADDRESS NO. REPRESENTATION OF OBJECT TO BE RETRIEVED

| CUSTOMER NUMBER | NAME | ADDRESS CODE | STREET BLOCK | ADDRESS NO. | CUSTOMER INFORMATION |
|---|---|---|---|---|---|
| 0000011002 | ICHIRO YAMAMOTO | 31020601 | 02 | 03 | XXXXXXXXXXXX |
| 0000011002 | JIRO IWASAKI | 31020601 | 02 | 03 | XXXXXXXXXX |

```
┌─────────────┬──────────────┐
│             │ CANDIDATE    │
│             │ DATA         │
│     ┌───────┤              │
│     │       │ YAMAMOTO     │
│     │YAMADA │ 1-2-3        │
│     │       │ IWASAKI      │
│     │       │ 1-2-3        │
└─────┴───────┴──────────────┘
```

② RETRIEVED DATA REPRESENTATION

```
┌─────────────┬──────────────┐
│             │ CUSTOMER     │
│             │ DATA         │
│     ┌───────┤              │
│     │       │ YAMAMOTO     │
│     │YAMADA │ 1-2-3        │
│     │       │ XXXXXXXX     │
│     │       │ XXXXX        │
└─────┴───────┴──────────────┘
```

FIG. 14

| ITEM | | ADDRESS DATA FORMAT CONTENT |
|---|---|---|
| ADDRESS CODE / BLOCK CODE (KEY) | | ADDRESS AND BLOCK NUMBER |
| ADDRESS NAME | | ADDRESS NAME |
| MAP NUMBER | 1 | MAP NUMBERS OF MAPS RELATED TO ADDRESS |
| | 5 | |
| | 9 | |
| CUSTOMER SERIAL NUMBER | 1 | UPPER CUSTOMER SERIAL NUMBER |
| | 5 | |
| | 10 | |

DATABASE SYSTEM AND MATCHING METHOD BETWEEN DATABASES

BACKGROUND OF THE INVENTION

The present invention relates to a database system such as map/drawing information processing, and also to a matching method between the databases.

Conventional systems for performing multimedia processing of figures and images utilizing the graphic features of workstations have been developed. The conventional multimedia processing operations have been proposed in, for instance, Nikkei Computer publication "Map Information System Highly Expected as a Tool for Strategy Information System" issued on Aug. 14, 1989, pages 75 to 85, in which the map database has been previously linked with the attribute database oriented to, or associated with, a business use, or application, and the retrieval operation is performed with respect to the linked data.

As a second conventional technique, there is a report on such a forming method for an information guiding database, in which the map database is linked with the telephone directory database functioning as the attribute database associated with the business use, and the highly valuable databases may be established ("Consideration on Linking Method between Telephone Directory Database and Map Database" reported at 70th anniversary of Electronic Information Communication Institute, page 6-91). In this publication, to increase the linkage rate of the name part between two databases, the name part is divided into the words which are furthermore classified with the attributes so as to compare the words with each other.

As a third conventional technique expanded from the second conventional technique, such a method has been described which employs the hierarchical dictionary capable of handling the synonyms and also abbreviated words related to the respective words classified with the attributes thereof in order to increase the linkage rate ("Consideration on Linking Method between Telephone Directory Database and Map Database (No. 2)" reported at conference for information system group of Electronic Information Communication Institute, page 1-111).

However, there are various problems in the matching operations between the databases to handle such maps and figures.

As a first problem, a large quantity of synonyms and abbreviated words have been contained in the name part registered in the database. However, the structure of the hierarchical thesaurus dictionary has been described in only a portion of these conventional methods. No concrete method for inferring the synonyms and abbreviated words based upon the key words has been proposed.

There is a second problem in that, although the matching operation may be mutually performed when the map database has been previously linked, or matched with the attribute database oriented to the business use (for instance, customer attribute database) in one-to-one correspondence, no retrieval operation is carried out when the matching operation is executed between the mutually not linked databases.

The above-described conventional methods do not provide a better solution, taking these problems into account.

SUMMARY OF THE INVENTION

An object of the present invention is to infer a synonym and an abbreviated word from a certain key word so as to absorb vagueness contained in the corresponding key word between the databases and thus increase matching data among a plurality of databases.

Another object of the present invention is to retrieve objective data with respect to the non-matched data.

To achieve the above-described object, according to the present invention, a key word to be matched is subdivided into a common noun part and a proper noun part, a rule for inferring production forms of the synonyms and abbreviated words is formed, and furthermore a combination rule for combining results inferred with employment of these rules with each other is formed. Thus, a large quantity of key words for the matching process operation are inferred with employment with above-described rule group.

With the above-described method, a large quantity of objective key words for supplementarily solving the vagueness among the key words to be matched may be inferred and therefore the linkage rate among the databases may be considerably increased.

Also, in accordance with the present invention, an address database for linking the map data and attribute data associated with the business use with an address code/street block is employed. The attribute data may be retrieved from the map data and, additionally, the map data may be retrieved from the attribute data even when the data to which the map data is not linked with the business-use-oriented data is used.

There are, for instance, an address code, a street block, an address, a map number (the map number also contains address numbers), and a customer number as the address data. Even when the map data is not linked with the customer attribute data in one-to-one correspondence, objective data on the customer attribute data may be retrieved from the map data as well as objective data on the map data may be retrieved from the customer data by passing through the address data. As a consequence, even if the map data is not matched up to the attribute data, the objective data may be retrieved so that there are very few cases where no relevant data is present during the retrieval operation.

Other objects and features of the present invention will become apparent from the following detailed description.

BRIEF DESCRIPTION OF THE DRAWINGS

FIG. 5 is a list representing content samples of a proper noun-to-synonym rule for inferring a synonym from an abbreviated key word of a proper noun;

FIG. 6 shows a particular example of a combination rule for combining synonyms which have been inferred from a common noun and a proper noun;

FIG. 7 is a list representing that code data and name data are mixed in a matching key and a matching object key;

FIGS. 13A and 13B schematically illustrate examples for retrieving customer attribute data from map data in a case of no matching; and FIG. 14 represents a detailed format of address data.

DESCRIPTION OF THE PREFERRED EMBODIMENT

Figure 1:
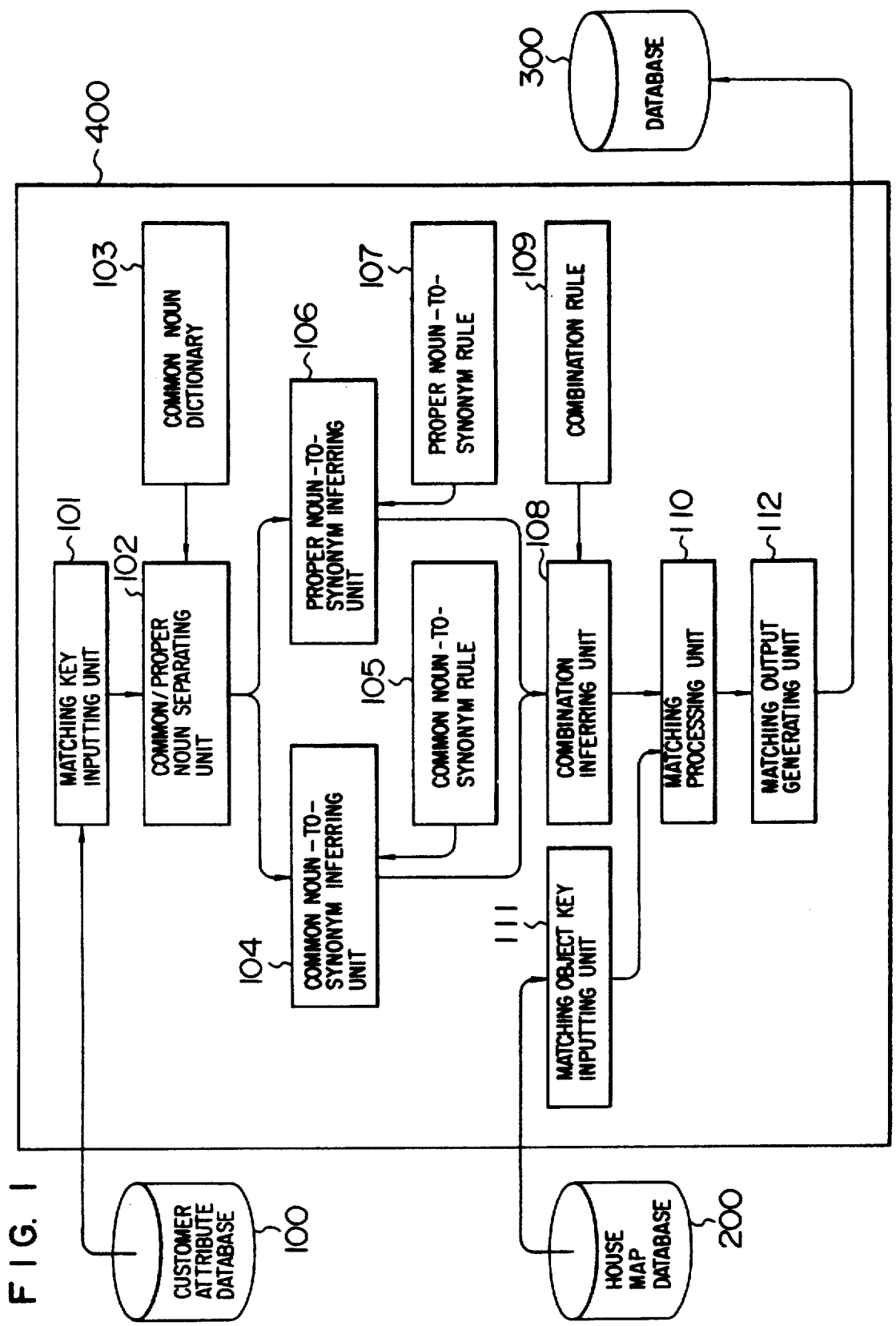
FIG. 1 is a schematic block diagram representing an overall arrangement of a database system according to an embodiment of the present invention.

Referring now to FIG. 1, an overall arrangement of a database system according to an embodiment of the present invention will be described. It should be noted that although the embodiment of the present invention will be described, taking as an example a multimedia system for using map data and customer attribute data as business-use oriented data, the present invention is not limited to this application but may be applied to other various applications.

FIG. 1 is a schematic block diagram for representing an entire arrangement of the database system. This database system comprises a customer attribute database 100 as a first database; a map database 200 as a second database; a third database 300 for storing therein matching results; and a processor 400 for performing a matching process. It should be noted that the third database 300 is not necessarily required, but may be omitted when the matching results are directly outputted. In the above-described embodiment, the customer attribute database corresponds to the first database and the map database corresponds to the second database. Alternatively, since these databases may be mutually matched with each other, these databases may be exchanged.

These constructive elements shown in FIG. 1 will now be described more in detail. Note that the term "key" as used herein and in the drawings is merely an alternative expression for "key word". In the customer attribute database 100, there has been stored data on matching conditions. The processor 400 comprises a matching key input unit 101, a common/proper noun separating unit 102, a common noun dictionary 103, a common noun-to-synonym inferring unit 104, a common noun-to-synonym rule 105, a proper noun-to-synonym inferring unit 106, a proper noun-to-synonym rule 107, a combination inferring unit 108, a combination rule 109, a matching processing unit 110, a matching object key inputting unit 111, and a matching output generating unit 112. The unit 101 inputs a matching condition key therein from the customer attribute databases 100. The unit 102 separates the inputted matching key into a common noun and a proper noun. The dictionary 103 is referred to when the inputted matching key is separated into the common noun and the proper noun. The unit 104 infers a similar common noun to the separated common noun as the separated matching key having vagueness by using a synonym rule which is stored in the synonym rule 105. The unit 106 infers a similar proper noun to the separated proper noun as the separated matching key having vagueness by using a synonym rule which is stored in the synonym rule 107. The unit 108 infers an optimum combination as a matching key from synonyms inferred by the units 104 and 106. A rule for the optimum combination as the matching key is stored in the unit 109. The unit 110 matches data retrieved from the database 200 to the matching key. The unit 111 inputs a matching object key from the map database 200 to the unit 110. The unit 112 generates from the matching result data a file which is stored in the database 300. The database 200 stores data as the matching object key therein and the database 300 stores matching results from the processor 400.

In the database system configured as mentioned above, an operation of the matching processing will be described below, taking a particular example.

Figure 2:
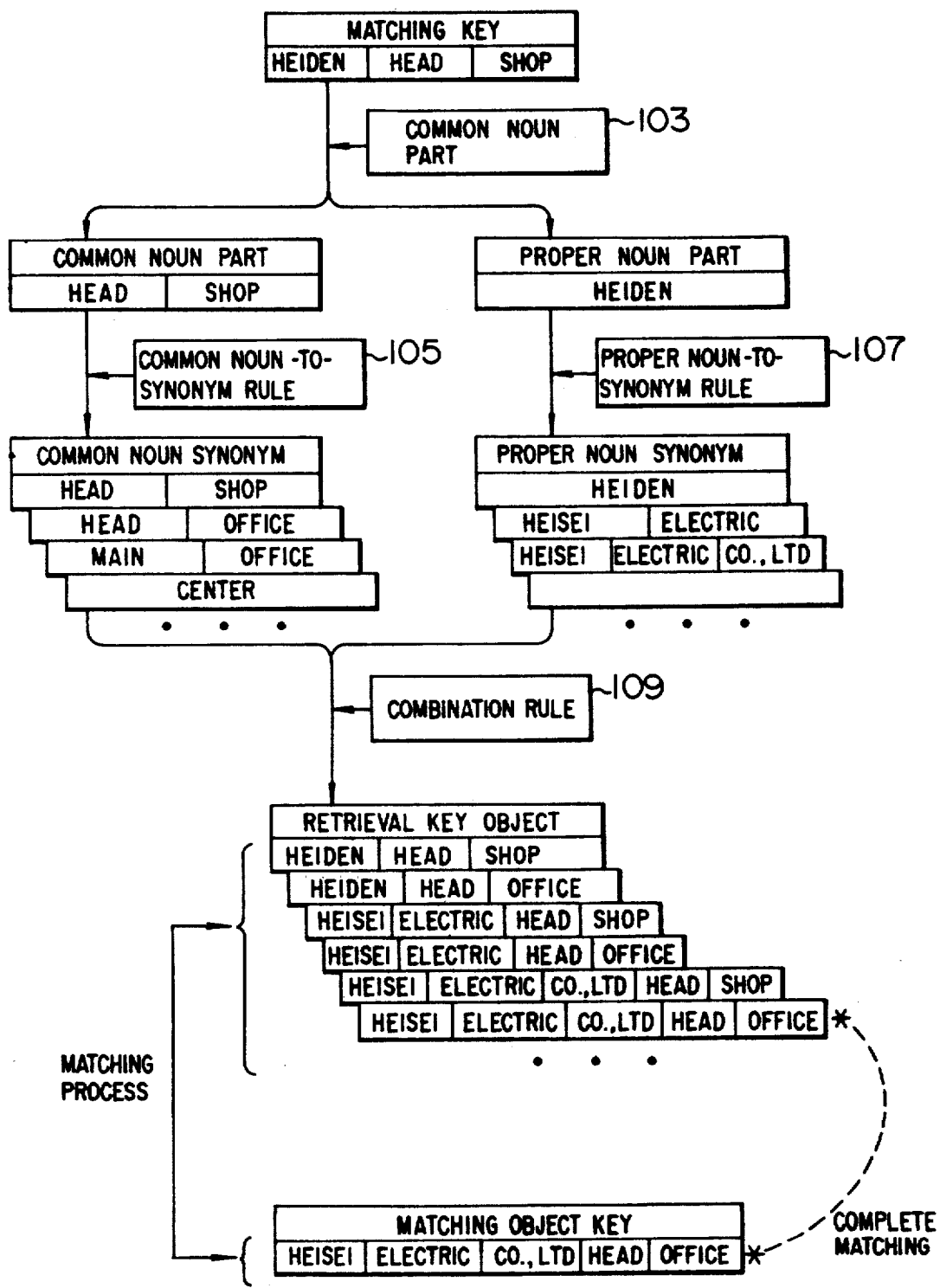
FIG. 2 illustrates data processing steps for inference processing operation.

In FIG. 2, assume that data "HEIDEN head shop" as a matching key of the database 100 is inputted to the unit 102. At this time, the unit 102 separates the matching key into a common noun part and a proper noun part. For this purpose, the dictionary 103 is used. A common noun synonym and a proper noun synonym are inferred based upon the common and proper noun parts by the units 104 and 106, respectively. The common noun-to-synonym rule 105 and proper noun-to-synonym rule 107 are utilized in these inferring processes. Subsequently, the inferred synonyms of the common and proper noun parts are combined in an optimum combination by the unit 108, whereby matching key candidates used in matching process with data stored in the database 200 are inferred. The combination rule 109 is used for this inferring process. Then, the matching process of each matching key candidate with a matching object key inputted from the map database 200 via the unit 111 is performed in the unit 110. Thus, a final matching result is generated in the unit 112 and thereafter stored into the database 300.

In a case that the unit 110 does not possess such high matching processing capability as the multi-item parallel partial matching mechanism, as described in the publication "Fast Pattern Matching in Strings SIAM J. Computing" by Knuth D. E. et al, vol. 6, No. 2, pages 323 to 350, in 1977, the matching process stage may be realized not to infer both the common and proper noun synonyms in parallel but in a manner as follows. That is to say, in such matching process, a partial matching list including many proper noun synonyms as matching candidates is first obtained. The final matching result can be obtained from a partial matching function of the matching candidates to the inferred synonyms of the common noun part.

In the above-described matching process, the respective elements which construct the processor 400 will now be successively described more in detail with reference to FIGS. 1, 3 through 7. At the beginning, the matching key inputting unit 101 retrieves a key item for designating a matching key from the customer attribute database 100 as a first database, and then outputs a matching key to the unit 102 as a part of matching processing system. Alternatively, when there is not provided the database 100, data which has been inputted by a user via a keyboard of a workstation or the like may be used. A sort of the matching key is no limitation in roman characters, katakana characters or kanji (chinese) characters. However, in order to simplify the post-processing operations, when the key is designated the roman characters, katakana characters or hiragana characters, all of these characters should be previously transformed into kanji characters by a kana/kanji transforming unit (not shown) having a kana/kanji converting function.

Subsequently, the matching key designated by the inputted kanji character is separated into the common noun part and proper noun part in the common/proper noun separating unit 102. It should be noted that a major object of the separation into the common and proper noun parts is to reduce the synonym dictionary for matching purposes as small as possible. For instance, the common nouns correspond to generic community names and occupation names such as a "school", a "firm" and a "construction". The sorts of common nouns become several hundreds as indicated in an occupation column of a telephone directory. The capacity necessary for these data are considerably smaller than that for the proper nouns such as specific firm names and personal names. As a consequence, as the basic separating method, a comparison is made between the content of the common noun dictionary 103 and the content of a character string of the inputted matching key, based upon the partial matching function for the character string, as described in the publication "Efficient String matching: An Aid to Bibliographic Search" by Aho, C et al., Comm. ACM, vol. 18, No. 6 pages 333 to 340, in 1975 and so on. Thus, the longest character string which is matched to the content of the common noun dictionary is extracted. In this case, the reason why the extraction of the common noun part is carried out before the proper noun, is that the sorts of the common nouns are of the order of several hundreds, as represented in the occupation columns of the telephone directory, and also the total number of the common nouns is considerably smaller than that of the proper nouns. It should be noted that, as the structure of this common noun dictionary 103, there is such a structures that common nouns are merely arranged, or that the commonly usable character substrings are linked to one another by a dictionary type pointer. Accordingly, there is no limitation in the structure of the common noun dictionary. However, the latter-mentioned dictionary type pointer structure has the following merit as represented in an example of FIG. 3. That is, since individual character substrings such as "office", "head" and "shop" are linked by the pointers for character strings such as "office", "head office", and "head shop", such character strings can be accessed in the same manner as each string as a common noun is accessed in a case that the common noun is stored in the dictionary in unit of string. Moreover, in this case, the memory capacity can be considerably reduced and higher accessing time may be expected.

Figures 3, 4:
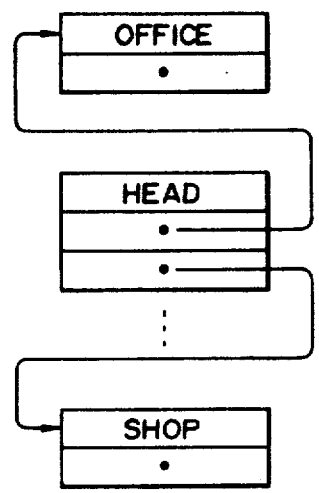
FIG. 3 represents a dictionary structure to extract a common noun from a matching key.
FIG. 4 is a list representing content samples of a common noun-to-synonym rule for inferring a synonym from common noun.

Next, a synonym matching method performed by the common noun-to-synonym inferring unit 104 by use of the common noun-to-synonym rule 105 will now be described. First, the synonym rule 105 stores synonym rules related to common nouns as shown in FIG. 4 by dividing them into an "inputted key word" part as an "if"-part and an "associative key word" part as a "then"-part. In other words, the rule 105 stores therein in a list form the rules, each of which includes an inputted key word in the if-part and a key word group with fuzziness associated with the inputted key word in the then-part. In this case, the inferring mechanism known as the forward inference system as described in Journal of Japanese Society of Artificial Intelligence "Expert System for Transferring Programming Knowhow from Skilled to Unskilled programmers" by Hiroshi Tsuji and Hajime Hashimoto, vol. 3, No. 6, pages 750 to 764 in 1988, is employed and represents behavior of the so-called "production system" in which the associative key words with the given input key word are again used as the input key words. For instance, when "a head office" is a key word, "a head shop" and "a main office" are obtained as the associative key words. Furthermore, when the "main office" is used as the key word, a "center" is inferred. Thus, all of the associative key words obtained from much production behavior are stored in a list and transferred to the combination inferring unit 108.

On the other hand, the forward inference method based on the production system is applied to the synonym inferring method in the proper noun-to-synonym inferring unit 106, similarly to that in the unit 104. In this case, the proper noun-to-synonym rule 107 is related to the abbreviated words of a proper noun as shown in FIG. 5 and corresponds to a rule for associating a formal name. For instance, when a "HEIDEN" ("DEN" means electric in Japanese) is a key word, the associative key words such as a "HEISEI Electric" and a "HEISEI Electric Co., Inc." and the like are inferred with fuzziness. All of the associative keywords are stored in a list and then transferred to the unit 108.

It should be noted that as the fuzziness of the inferring results when a plurality of production links are traced, as described above, various calculation methods are conceived in which the fuzziness traced to this stage are used. For instance, many methods using a maximum value, a minimum value, a product or a summation of all the traced rule fuzziness have been conceived. In this embodiment, a "product" is employed. For instance, in case of the inference method by two-stage production through a rule "A" and a rule "B", assuming now that fuzziness in the rule "A" is equal to "pa" and fuzziness in the rule "B" is equal to "pb", resultant fuzziness "pm" inferred from the productions in two rules A and B is calculated by pm=pa×pb.

Then, the inferring method in the unit 108 will now be explained. Assuming now that an inferring result of the proper noun part is "aN", inferred fuzziness obtained in this time is "pa", an inferring result of the common noun is "bN" and inferred fuzziness obtained at this time is "pb", there are set two threshold values "thu" and "thl" with respect to each of the inferred fuzziness. Then, a combination between both the inferred synonyms of the proper noun part and the common noun part is obtained by referring to a combination rule 109 for controlling a comparison between the fuzziness values under optimum condition, and is added to a combination key word list. For instance, in the combination rule shown in FIG. 6, there is shown that the combination "aNbN" is added to the combination key word list when the fuzziness "pa" of the inferred result "aN" for the proper noun part is higher than the threshold value "thu" and also the fuzziness "pb" of the inferred result "bN" for the common noun part is higher than the threshold value "thl", in the if part. Further, in the subsequent rule, there is shown that the combination "bNaN" is added to the combination key word list when the fuzziness "pa" of the inferred result "aN" for the proper noun part is higher than the threshold values of "th1" and lower than the value of "thu", and also the fuzziness "pb" of the inferred result "bN" for the common noun part is higher than the threshold value "thu". As a particular example of the latter-mentioned case, assuming now that "HEISEI Electric" is inferred as the proper noun synonym and "Co. Ltd." is inferred as the common noun synonym when the inferred fuzziness of the common noun synonym is higher than that of the proper noun synonym, it represents that "Co., Ltd HEISEI Electric" in which the common noun synonym precedes the proper noun synonym, may be conceived as a candidate of the matching key word. Thus, the inferred matching key words are listed up and supplied to the succeeding matching processing unit 110.

While the inferring method of the matching key word has been described, a matching process effected in the matching processing unit 110 will now be described. In accordance with this matching process, an inferring matching process designated by a matching key word is hierarchically combined with a limitation with employment of items for limiting a matching range such as an address code, whereby matching speed and precision may be improved. The content of the matching key word in the present embodiment, as represented in FIG. 7, is divided into four parts; and address code part; a house name code part; a house code part; and a private name code part. Numeral data has been stored into the address code part and house code part, whereas character data has been stored into the house name code part and private name code part. It should be noted that this data format is the same as that for the matching object key word.

Figure 8:
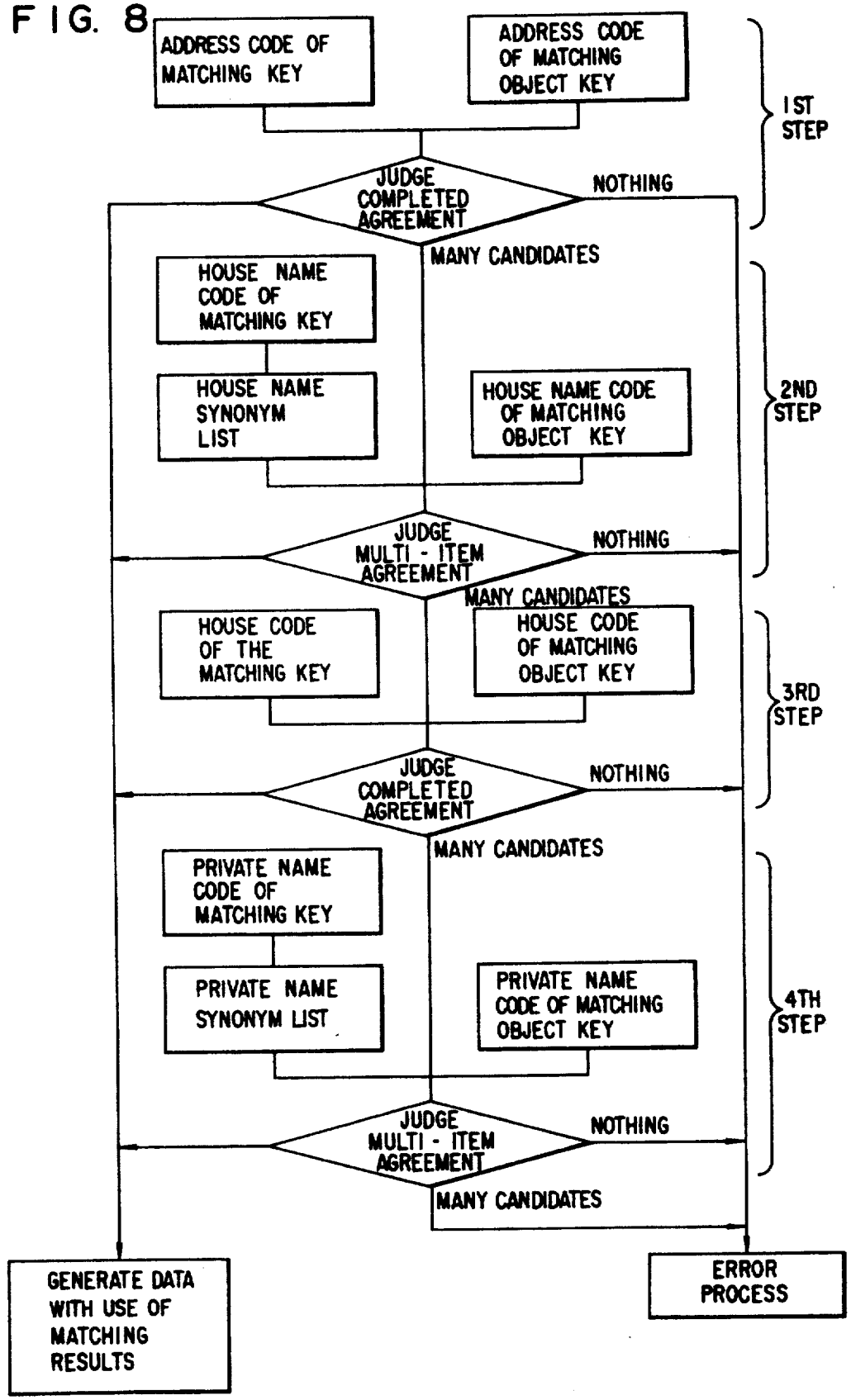
FIG. 8 is a flowchart for representing a process flow to increase a matching speed by combining a limitation of a matching range by code data and inference of synonyms.

An overall flow of a hierarchical matching process under such a condition is represented in FIG. 8. In this case, the matching process is roughly constructed of four step portions. At the first step portion, a judgement is made of whether or not complete agreement between the address codes of the matching key and the matching object key is achieved. If the unique match can be obtained at this stage, the data is generated by use of the matching results and then stored into the third database 300. To the contrary, if there is no matching data, an error process is carried out and thereafter the subsequent matching process is commenced. On the other hand, when there are large quantities of matching candidates, a judgement is made that the matching process at this stage is incomplete and the matching process therefore is advanced to a next step portion.

At the second step portion, agreement between the house name codes of the matching key and the matching object key is judged. Since the house name code corresponding to the matching key is name data in this case and contains vagueness, inference related to the synonyms of the house name code is carried out once, thereby obtaining a house name synonym list. A judgement is made of multi-item agreement between the house name synonym list and the house name code part of the matching object key. If the unique match can be obtained at this stage, data is generated by use of the matching result and the generated data is stored into the third database 300. Conversely, if there is no matching code, the error processing operation is performed and thereafter the matching process is advanced to a next step portion. On the other hand, if there are many candidates, a judgement is made that the matching process at this stage becomes imperfect and the matching process is advanced to the subsequent step portion.

At the third step portion, a judgement is made of an agreement between the house codes of the matching key and the matching object key. Since this house code is numeral data which may be judged with respect to the complete agreement, a process operation similar to that at the first step portion may be carried out.

At the fourth step portion, an agreement between the private name codes of the matching key and the matching object key. Since the private name code corresponding to the matching key in this case is name data, and contains vagueness, inference related to the synonyms of the private name code is once performed so as to obtain a private name synonym list. Thereafter, a processing operation similar to that at the second step portion may be carried out.

As previously explained, in accordance with the present embodiment, the matching process between a plurality of databases, especially the map database and inherent database ca be carried out by the inference method with use of a knowledge base, even if no direct matching may be established because of vague information contained in the matching key. As a consequence, highly valuable databases with matching the contents of the plural databases with each other may be automatically formed.

Another embodiment of the present invention will now be described. Even when no matching was established since the vague information such as the synonyms and abbreviated words has been contained in, for example, the names and private names, the matching between the databases could be realized in the above-described first embodiment. However, there are still many cases that no matching and therefore no retrieving operation cannot be performed. More specifically, this may be such a case that the map database is not directly linked with the database oriented to the business (customer attribute database), the map databases is mainly formed based upon the actual measurement, and the database oriented to the business use (customer attribute database) is formed based upon data obtained specifically for the business purpose. In such a case, the databases per se are separately formed and it is rather difficult to directly establish the matching between the databases. Accordingly, according to this embodiment, the databases each having no matching may be retrieved by utilizing a further separate database.

Figure 9:
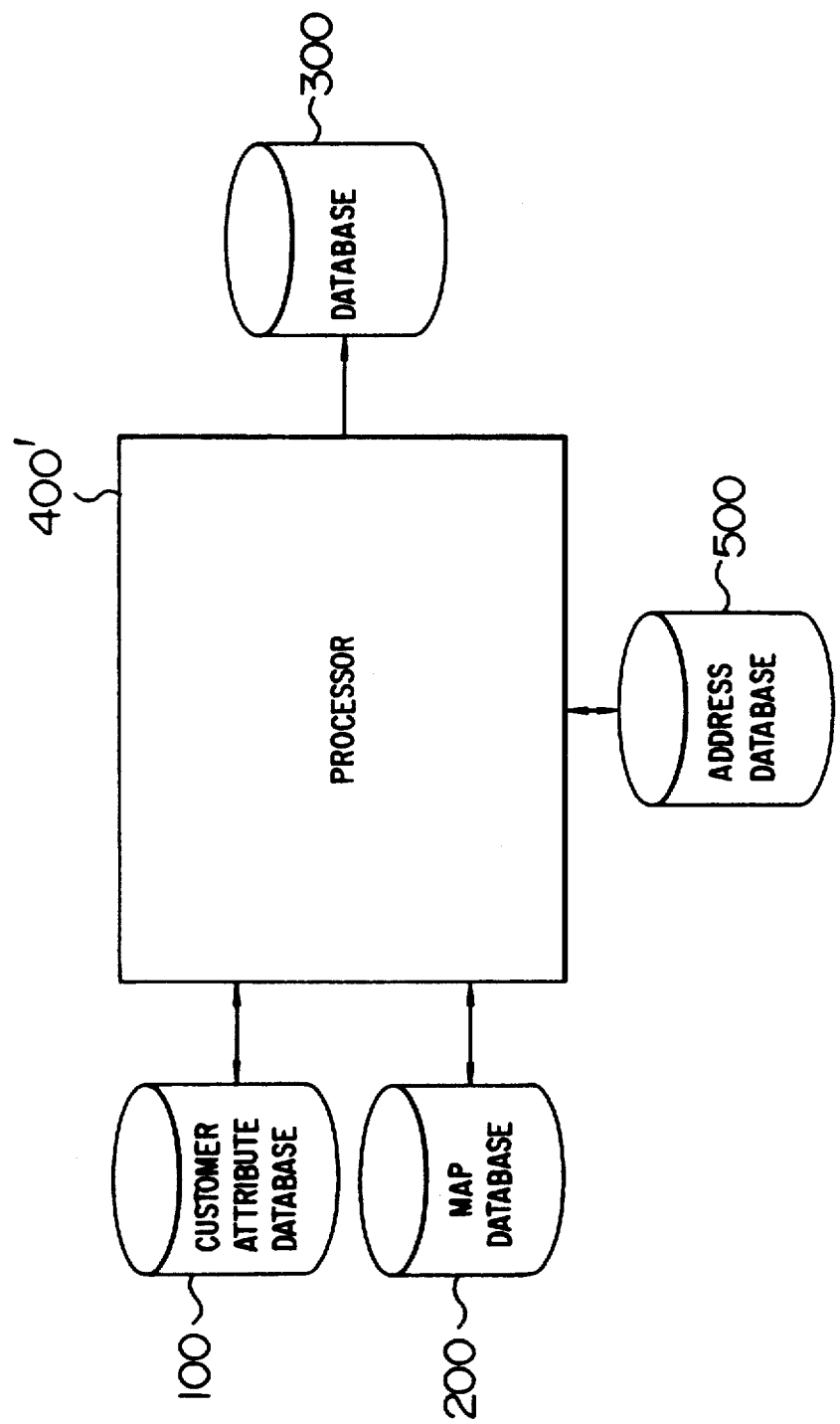
FIG. 9 is a schematic block diagram showing an overall construction of a database system according to another embodiment of the present invention.

FIG. 9 represents an arrangement of an overall database system according to the another embodiment of the present invention.

In FIG. 9, a customer attribute database 100 functioning as a first database stores therein information inherent to a customer such as an address code and the like in accordance with a customer number as a key. A map data base 200 functioning as a second database stores therein a coordinate value of a house frame, a name of owner, an address code and the like as a map number as a key. A database 300 functioning as a third database stores therein matching results, and a processor 400' performs a matching process and a retrieving process by use of various databases. An address database 500 functioning as a fourth database stores therein an address code, a map number, a customer number and the like in accordance with an address code and block code as a key. It should be noted that the third database 300 is not always required, similar to the above-described first embodiment.

In the database system with the above-described arrangement, as to a relationship between the customer attribute database 100 and map database 200, there are two cases. In one case, the corresponding house map data record has been previously linked with the customer attribute data record (i.e., matching is established). In the other case, this house map data record has not yet been linked therewith (i.e., no matching is established). The mutual retrieval in case of the matching condition may be performed by directly searching the customer attribute database 100 and the map database 200. When no matching is established, no retrieval operation can be essentially carried out with two database, namely the customer attribute database 100 and the map database 200.

There is the address database 500 as a mutual retrieving route in a case of no matching establishment, the address code and block code as the common item to the customer attribute database 100 and the map database 200 and is employed as the key, so that the mutual retrieval operation can be realized even when no matching is established among these databases. As a consequence, even when non-matched databases due to different names are employed, candidate data can be retrieved during the retrieving operation.

Figure 10:
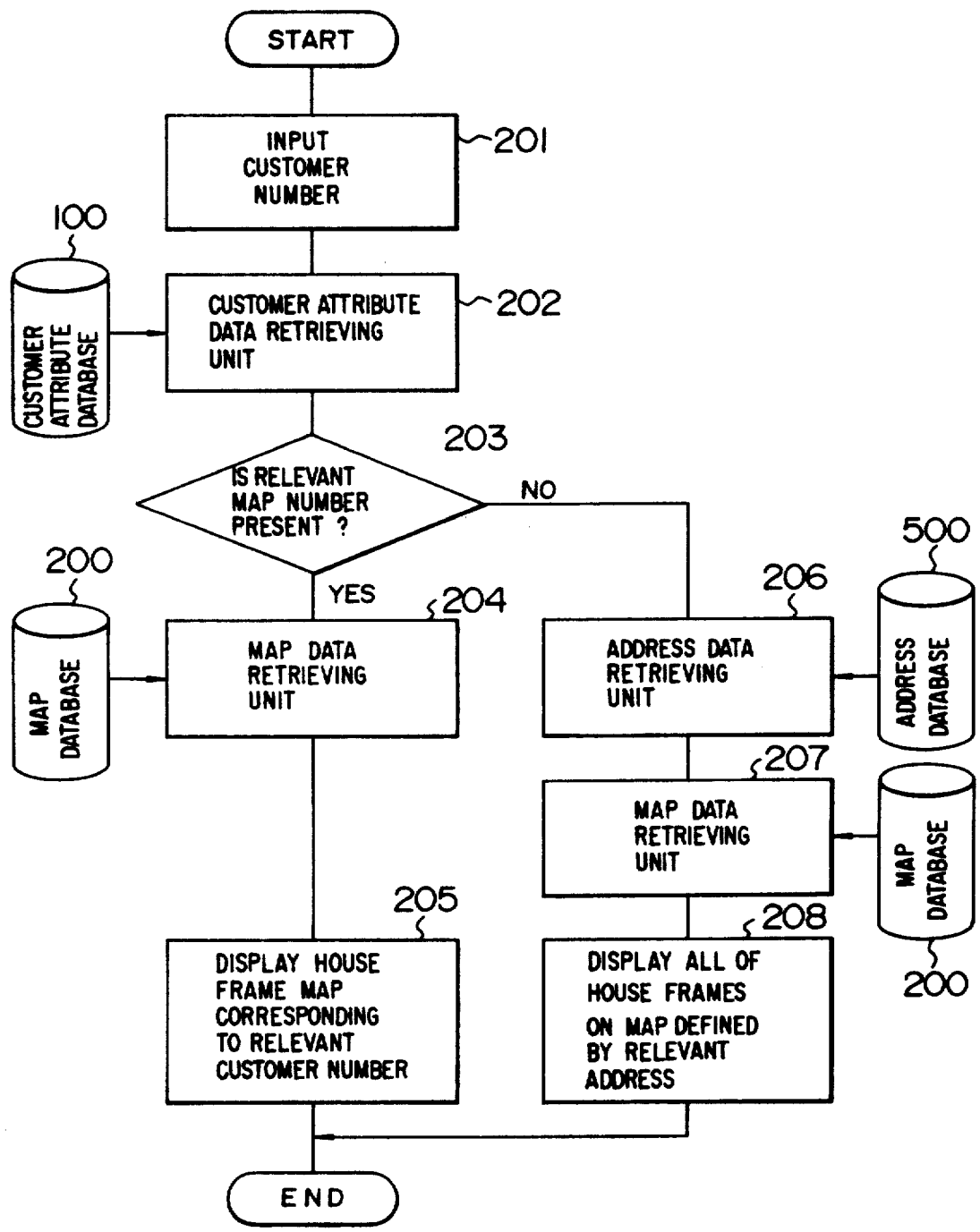
FIG. 10 is a flowchart for explaining a processing operation to retrieve map data from customer attribute data.

FIG. 10 is a flowchart for explaining such a case that the map data is retrieved from the customer attribute data.

Figure 11:
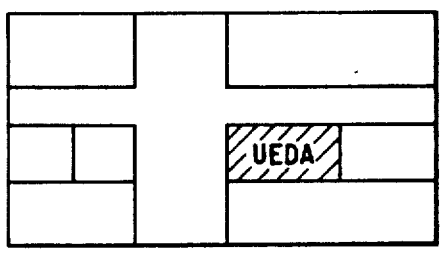
FIG. 11 schematically illustrates an example when map data is retrieved from customer attribute data in a case of no matching.

FIG. 11 represents an example of retrieving map data based upon the customer attribute data when no matching is established.

The map data retrieval will now be described in more detail with reference to FIGS. 10 and 11. It should be noted that a series of the following process operations are performed in the processor 400.

At a step 201 shown in FIG. 10, a customer number functioning as a key is input when the customer attribute database 100 is retrieved whereas at a step 202 the relevant customer attribute data record is retrieved in accordance with the customer number being used as a key.

At a step 203, a processing unit for judging whether or not the corresponding customer attribute data record is matched.

A step 204 is a route when the matching is established. In this case, since the corresponding map number has been stored into the customer attribute data record, such a process is carried out that the relevant map data record is retrieved by employing this map number as a key.

At a step 205, the map data record retrieved at the step 204 is entered to display a preselected map and house frame. It should be noted that this house frame is displayed in a certain color.

A step 206 is a route when no matching is established. In this case, no corresponding map number has been stored into the customer attribute data record (refer to a record format for retrieving customer attribute data as shown in ① of FIG. 11).

In this case, an address data record is retrieved under condition that an address code/block code contained in the customer attribute data record is used as a key (refer to a record format represented in ② of FIG. 11).

At a step 207, the relevant map number contained in the address data record is used as a key and this map data record is retrieved.

At a step 208 the map data record retrieved by the step 207 is entered so as to display a predetermined map and house frame. In this case, all of house frames having the same address are displayed in a certain color (refer to ③ of FIG. 11), in which a map within a range of a street block is retrieved from a map number of address data and house frames with the same address are displayed in color. A single house is displayed in this embodiment.

The map retrieval operation may be realized even with non-matched data due to erroneous name present on the map.

Figure 12:
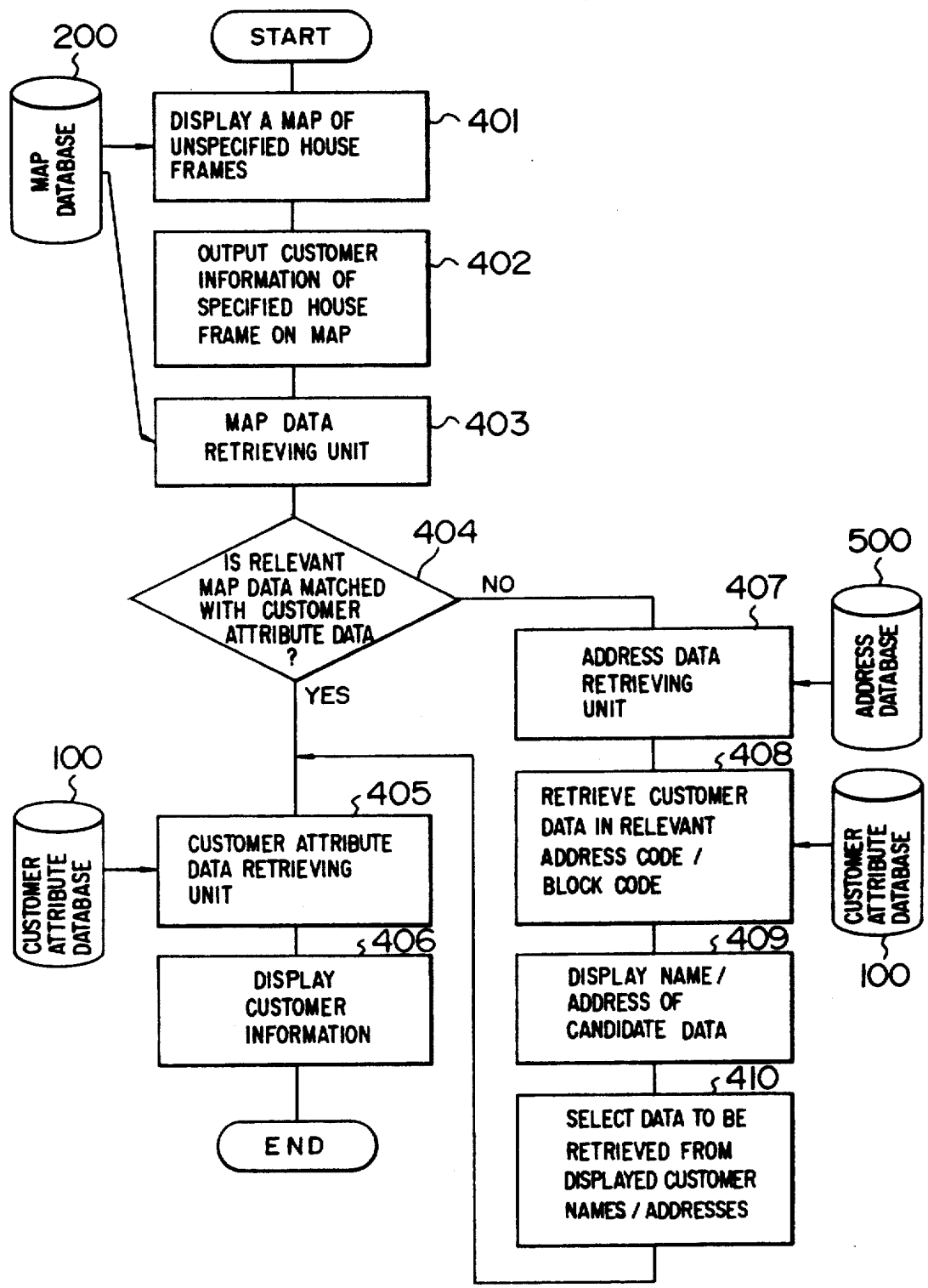
FIG. 12 is a flowchart for explaining a processing operation to retrieve customer attribute data from map data.

FIG. 12 is a flowchart for explaining such a case that the customer attribute data is retrieved from the map data.

Figure 13A:
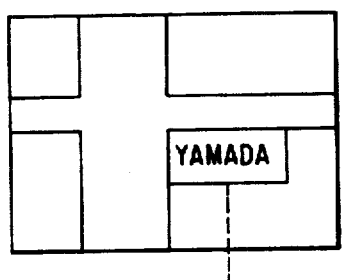

FIGS. 13A and 13B represent an example of retrieving the customer attribute data from the house map data when no matching is established.

The retrieval operation will now be described in more detail with reference to FIGS. 12 and 13A and 13B. It should be understood that a series of processing operations is executed in the processor 400'.

At a step 401 shown in FIG. 12 unspecified map and house frame are displayed.

At a step 402 an instruction is received to output customer information of a specified house frame under the display state at the previous step 401.

At a step 403 a process for retrieving a map data record of the house frame designated on the map is performed.

At a step 404 it is judged whether or not the relevant map data record at the step 403 is matched to the customer attribute data record. When the matching is established, the customer number is present in the customer number column of the map data record. To the contrary, when no matching is established, no customer number is present in the customer number column thereof (refer to ① of FIG. 13A).

A step 405 is a route when the matching is established, the customer number contained in the map data record is employed as a key and the relevant customer attribute data record is retrieved.

At a step 406 the customer attribute data record retrieved at the step 405 is entered so as to display customer information and the like (refer to ② of FIG. 13B. When a selection is made by an operator to pick up data to be retrieved among the customer attribute data objects displayed on the screen, this figure is displayed).

A step 407 is a route when no matching is established, and the address data records is retrieved under condition that the address code/block code contained in the map data record is employed as a key (refer to ② of FIG. 13A).

At a step 408 the customer number contained in the customer number column of the address data record is employed as a key so as to retrieve the corresponding customer attribute data record (refer to ② of FIG. 13A and ① of FIG. 13B).

At a step 409 the customer attribute data record retrieved at the previous step 408 is entered in order to display name, address and the like (refer to ① of FIG. 13B).

At a step 410, an operator selects data from the objective custom data which has, or have been displayed at the previous step 408. When certain data is selected from the objective data, the customer attribute data is specified and then transferred to the customer attribute data retrieving part at the previous step 405 so that the customer information is displayed at the step 406 (see ② of FIG. 13B).

In case that the candidate data are displayed in FIG. 10 (step 208), FIG. 11 (③), FIG. 12 (steps 409 and 410)

and FIG. 13B (①) and ②)), and that the data is selected to instruct the combination by the user, a process for linking the map data and customer attribute data is performed at this time.

FIG. 14 represents a format of address data.

As the address code/street block number is employed as the key, the map number and customer serial number with respect to the map located within this address and street block have been stored.

In accordance with this embodiment, for instance, 9 map numbers can be stored as the maximum number of the case. Also, for example, 10 customer serial numbers may be stored as the maximum number of the case.

As previously described, according to this embodiment, even when the business-use oriented customer attribute database is not matched to the map database, there is an advantage that the candidate data can be outputted and mutually received.

The embodiments described herein are therefore illustrative and not restrictive, the scope of the invention being indicated by the appended claims and all variations which come within the meaning of the claims are intended to embraced therein.

We claim:

1. A database system comprising:
a first database for storing a matching keyword;
a second database for storing a matching object keyword;
first inputting means for inputting the matching keyword from said first database;
separating means for separating the matching keyword into a common noun part and a proper noun part in accordance with a common noun dictionary;
first inferring means for inferring first noun parts associated with the separated common noun part in accordance with a first rule;
second inferring means for inferring second noun parts associated with the separated proper noun part in accordance with a second rule;
a combination inferring means for combining each of the first noun parts with each of the second noun parts to form combinations and for inferring candidates associated with the matching keyword from the combinations in accordance with a combination rule;
second inputting means for inputting the matching object keyword from said second database;
matching means for performing a matching process of the matching object keyword to each of the candidates; and
output means for generating and outputting a matching output based on a result of the matching process.

2. The database system according to claim 1, further comprising
a third database for storing the matching output from said output means.

3. The database system according to claim 1, wherein said first inputting means further comprises means for inputting the matching keyword through a keyword input, instead of said first database.

4. The database system according to claim 1, further comprising means for managing the first and second rules and the combination rule.

5. The database system according to claim 1, further comprising means for transforming a form of matching keyword into a kanji character string.

6. A map information database system comprising:
an attribute database for storing attribute data associated with a business;
a map database for storing therein map data;
a result storing database for storing therein a matching result;
matching keyword input means for inputting as a matching keyword the stored data from one of said attribute database and said map database;
common/proper noun separating means for separating the matching keyword into a common noun and a proper noun in accordance with a common noun dictionary;
common noun-to-synonym inferring means for inferring first synonyms associated with the separated common noun in accordance with a common noun-to-synonym rule;
proper noun-to-synonym inferring means for inferring second synonyms associated with the separated proper noun in accordance with a proper noun-to-synonym rule;
combination inferring means for combining each of the first synonyms with each of the second synonyms and for inferring synonyms candidates of the matching keyword from the combinations in accordance with a combination rule;
object keyword inputting means for inputting as a matching object keyword the stored data from the other of said map database and said attribute database;
matching processing means for performing a matching process by use of the synonym candidates and the matching object keyword; and
matching output forming means for storing a result of the matching process to the result storing database.

7. The map information database system according to claim 6, wherein at least one of the matching keyword and the matching object keyword contains an address code, a name code, and a house code.

8. A map information database system comprising:
an attribute database for storing attribute data associated with a business;
a map database for storing map data;
an address database for storing address data containing at least an address code and a block code, the address code and the block code being included at least in the attribute data and the map data;
attribute data retrieving means for performing a retrieving operation for said attribute database in accordance with a first predetermined keyword;
map data retrieving means for performing a retrieving operation for said map database in accordance with a second predetermined keyword; and
address data retrieving means for performing a retrieving operation for said address database and selectively outputting the address code and the block code as the first and second predetermined keywords to said attribute data retrieving means and said map data retrieving means, to enable said attribute data retrieving means and said map data retrieving means to perform the retrieving operation for said map database and said attribute database, respectively.

9. A method for matching between first and second databases, comprising the steps of:
separating a matching keyword from said first database into a common noun part and a proper noun part in accordance with a common noun dictionary;

inferring first noun parts associated with the separated common noun part from the separated common noun part in accordance with a common noun rule;

inferring second noun parts associated with the separated proper noun part from the separated proper noun part in accordance with a proper noun rule;

combining each of the first noun parts with each of the second noun parts to infer synonym candidates of the matching keyword in accordance with a combination rule; and performing a matching process by use of the synonym candidates and a matching object keyword from said second database.

10. A method for matching between databases, in a map information database system for matching between an attribute database for storing attribute data associated with a business and a map database for storing map data, and for storing a matching result into a result storing database, comprising the steps of:

separating a matching keyword from one of said attribute database and a said map database into a common noun and a proper noun in accordance with a common noun dictionary;

inferring first nouns similar to the separated common noun from the separated common noun in accordance with a common noun synonym rule;

inferring second nouns similar to the separated proper noun from the separated proper noun in accordance with a proper noun synonym rule;

combining each of the first nouns and each of the second nouns candidates of the matching keyword from the combinations in accordance with a combination rule;

performing a matching process by use of the candidates and a matching object keyword from the other of said map database and said attribute database; and storing the matching result in said result storing database.

11. The method according to claim 10, wherein said performing step further comprises the step of performing, when there exists an item for limiting a matching range between data in the data stored in said attribute database and said map database, a limiting process based upon the item before the matching process to limit the candidates, the matching process being hierarchically performed by use of the limited candidates.

12. The method according to claim 11, further comprising the step of repeatedly performing the hierarchical combination of the limiting process and the matching process until only one matching result is obtained.

13. The method according to claim 11, wherein the item is at least one of an address code, a block number, an address number, a postal code, a housing number and a room number as code information for limiting a geographic position.

14. A method for retrieving an attribute database for storing therein attribute data associated with a business and a map database for storing therein map data, comprising the steps of:

retrieving a first record from said attribute database in accordance with a first keyword;

retrieving a second record from an address database in accordance with at least an address code and a block code contained in the first record; and retrieving a third record from said map database in accordance with a second keyword contained in the second record.

15. A method for retrieving an attribute database for storing therein attribute data associated with a business and a map database for storing therein map data, comprising the steps of:

retrieving a second record from an address database in accordance with at least one of an address code and a block code contained in the first record; and retrieving a third record from said attribute database in accordance with a second keyword contained in the second record.

16. A method for retrieving map data in a system including a map database, a customer attribute database, an address database and a processor, the method comprising steps of:

inputting a customer number to the processor;

selecting customer attribute data from the customer attribute database in accordance with the customer number;

determining, by the processor, whether the selected customer attribute data includes a map number corresponding to desired map data;

retrieving the desired map data from the map database using the map number if the selected customer attribute data includes the map number;

retrieving address data including the map number from the address database if the selected customer attribute data does not include the map number;

retrieving the desired map data from the map database using the map number includes in the address data; and, displaying a map in accordance with the desired map data.

17. A method for retrieving customer attribute data in a system including a map database, a customer attribute database, an address database, and a processor, the method comprising steps of:

displaying a map of a plurality of house frames;

selecting one of the plurality of house frames displayed;

retrieving selected map data from the map database corresponding to the selected house frame;

determining, by the processor, whether the selected map data includes a customer number corresponding to desired customer attribute data;

retrieving the desired customer attribute data if the selected map data includes the customer number;

retrieving address data from the address database if the selected map data does not include the customer number;

retrieving the desired customer attribute data in accordance with the address data retrieved; and, displaying customer information in accordance with the desired customer attribute data.

* * * * *

UNITED STATES PATENT AND TRADEMARK OFFICE
CERTIFICATE OF CORRECTION

PATENT NO. : 5,210,868

DATED : May 11, 1993

INVENTOR(S) : Shigeru Shimada, et al.

It is certified that error appears in the above-identified patent and that said Letters Patent is hereby corrected as shown below:

Claim 15, column 14, insert the following language between lines 14 and 15:

-- retrieving a first record from said map database in accordance with a first keyword; --

Signed and Sealed this

Eleventh Day of January, 1994

*Attest:*

BRUCE LEHMAN

*Attesting Officer*     *Commissioner of Patents and Trademarks*